United States Patent
Hong et al.

(10) Patent No.: US 9,944,554 B2
(45) Date of Patent: Apr. 17, 2018

(54) PERFORATED MOTHER SHEET FOR PARTIAL EDGE CHEMICAL STRENGTHENING AND METHOD THEREFOR

(75) Inventors: Seung Jae Hong, Sunnyvale, CA (US); Casey J. Feinstein, San Jose, CA (US); Lili Huang, San Jose, CA (US); Sunggu Kang, San Jose, CA (US); Kuo-Hua Sung, San Jose, CA (US); John Z. Zhong, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 486 days.

(21) Appl. No.: 13/233,978

(22) Filed: Sep. 15, 2011

(65) Prior Publication Data

US 2013/0068505 A1    Mar. 21, 2013

(51) Int. Cl.
*H05K 1/03*    (2006.01)
*C03C 21/00*    (2006.01)

(52) U.S. Cl.
CPC ....... *C03C 21/002* (2013.01); *Y10T 29/49124* (2015.01)

(58) Field of Classification Search
CPC .................. C03C 21/002; Y10T 29/49124
USPC .......... 174/255, 250, 256, 258, 262
See application file for complete search history.

(56) References Cited

U.S. PATENT DOCUMENTS

| | | |
|---|---|---|
| 2,643,020 A | 6/1953 | Dalton |
| 3,626,723 A | 4/1968 | Emile |
| 3,415,637 A | 12/1968 | Glynn |
| 3,441,398 A | 4/1969 | Hess |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |
| 3,619,240 A | 11/1971 | Toussaint et al. |
| 3,652,244 A | 3/1972 | Plumat |
| 3,753,840 A | 8/1973 | Plumat |
| 3,798,013 A | 3/1974 | Inoue et al. |
| 3,843,472 A | 10/1974 | Toussaint et al. |

(Continued)

FOREIGN PATENT DOCUMENTS

| | | |
|---|---|---|
| AT | 283 630 B | 10/1970 |
| CN | 1277090 A | 12/2000 |

(Continued)

OTHER PUBLICATIONS

Japanese Patent Publication No. 2002-160932 (Jun. 4, 2002).*

(Continued)

*Primary Examiner* — Tremesha S Willis
(74) *Attorney, Agent, or Firm* — Brownstein Hyatt Farber Schreck, LLP

(57) ABSTRACT

Methods for chemically strengthening the edges of glass sheets are provided. Voids can be formed in a mother sheet. The edges of these voids may correspond to a portion of the new edges that would normally be created during separation and free shaping of the mother sheet. The mother sheet can then be immersed in a chemical strengthener. The edges of the voids can be chemically strengthened in addition to the front and back sides of the mother sheet. After thin film processing and separation, each of the resulting individual sheets has been chemically strengthened on both sides and on a portion of its edges.

22 Claims, 7 Drawing Sheets

(56) References Cited

U.S. PATENT DOCUMENTS

| | | |
|---|---|---|
| 3,857,689 A | 12/1974 | Koizumi et al. |
| 3,926,605 A | 12/1975 | Kunkle |
| 3,951,707 A | 4/1976 | Kurtz et al. |
| 4,015,045 A | 3/1977 | Rinehart |
| 4,052,184 A | 10/1977 | Anderson |
| 4,119,760 A | 10/1978 | Rinehart |
| 4,156,755 A | 5/1979 | Rinehart |
| 4,165,228 A | 8/1979 | Ebata et al. |
| 4,148,082 A | 12/1979 | Ganswein et al. |
| 4,212,919 A | 7/1980 | Hoda |
| 4,218,230 A | 8/1980 | Hogan |
| 4,346,601 A | 8/1982 | France |
| 4,353,649 A | 10/1982 | Kishii |
| 4,425,810 A | 1/1984 | Simon et al. |
| 4,537,820 A | 8/1985 | Nowobliski et al. |
| 4,646,722 A | 3/1987 | Silverstein et al. |
| 4,733,973 A | 3/1988 | Machak et al. |
| 4,842,629 A | 6/1989 | Clemens et al. |
| 4,844,724 A | 7/1989 | Sakai et al. |
| 4,846,868 A | 7/1989 | Aratani |
| 4,849,002 A | 7/1989 | Rapp |
| 4,872,896 A | 10/1989 | LaCourse et al. |
| 4,911,743 A | 3/1990 | Bagby |
| 4,937,129 A | 6/1990 | Yamazaki |
| 4,957,364 A | 9/1990 | Chesler |
| 4,959,548 A | 9/1990 | Kupperman et al. |
| 4,983,197 A | 1/1991 | Froning et al. |
| 4,986,130 A | 1/1991 | Engelhaupt et al. |
| 5,041,173 A | 8/1991 | Shikata et al. |
| 5,104,435 A | 4/1992 | Oikawa et al. |
| 5,129,934 A | 7/1992 | Koss |
| 5,157,746 A | 10/1992 | Tobita et al. |
| 5,160,523 A | 11/1992 | Honkanen et al. |
| 5,254,149 A | 10/1993 | Hashemi et al. |
| 5,269,888 A | 12/1993 | Morasca |
| 5,281,303 A | 1/1994 | Beguin et al. |
| 5,369,267 A | 11/1994 | Johnson et al. |
| 5,411,563 A | 5/1995 | Yeh et al. |
| 5,437,193 A | 8/1995 | Schleitweiler et al. |
| 5,445,871 A | 8/1995 | Murase et al. |
| 5,483,261 A | 1/1996 | Yasutake |
| 5,488,204 A | 1/1996 | Mead et al. |
| 5,525,138 A | 6/1996 | Hashemi et al. |
| 5,625,154 A | 4/1997 | Matsuhiro et al. |
| 5,654,057 A | 8/1997 | Kitayama |
| 5,725,625 A | 3/1998 | Kitayama et al. |
| 5,733,622 A | 3/1998 | Starcke et al. |
| 5,766,493 A | 6/1998 | Shin |
| 5,780,371 A | 7/1998 | Rifqi et al. |
| 5,816,225 A | 10/1998 | Koch et al. |
| 5,825,352 A | 10/1998 | Bisset et al. |
| 5,826,601 A | 10/1998 | Muraoka et al. |
| 5,835,079 A | 11/1998 | Shieh |
| 5,880,411 A | 3/1999 | Gillespie et al. |
| 5,930,047 A | 7/1999 | Gunz et al. |
| 5,953,094 A | 9/1999 | Matsuoka et al. |
| 5,985,014 A | 11/1999 | Ueda et al. |
| 6,050,870 A | 4/2000 | Suginoya et al. |
| 6,114,039 A | 9/2000 | Rifqui |
| 6,120,908 A | 9/2000 | Papanu et al. |
| 6,166,915 A | 12/2000 | Lake et al. |
| 6,188,391 B1 | 2/2001 | Seely et al. |
| 6,245,313 B1 | 6/2001 | Suzuki et al. |
| 6,287,674 B1 | 9/2001 | Verlinden et al. |
| 6,307,590 B1 | 10/2001 | Yoshida |
| 6,310,610 B1 | 10/2001 | Beaton et al. |
| 6,323,846 B1 | 11/2001 | Westerman et al. |
| 6,325,704 B1 | 12/2001 | Brown et al. |
| 6,327,011 B2 | 12/2001 | Kim |
| 6,350,664 B1 | 2/2002 | Haji et al. |
| 6,393,180 B1 | 5/2002 | Farries et al. |
| 6,429,840 B1 | 8/2002 | Sekiguchi |
| 6,437,867 B2 | 8/2002 | Zeylikovich et al. |
| 6,516,634 B1 | 2/2003 | Green et al. |
| 6,521,862 B1 | 2/2003 | Brannon |
| 6,621,542 B1 | 9/2003 | Aruga |
| 6,690,387 B2 | 2/2004 | Zimmerman et al. |
| 6,718,612 B2 | 4/2004 | Bajorek |
| 6,769,274 B2 | 8/2004 | Cho et al. |
| 6,772,610 B1 | 8/2004 | Albrand et al. |
| 6,810,688 B1 | 11/2004 | Duisit et al. |
| 6,936,741 B2 | 8/2005 | Munnig et al. |
| 6,955,971 B2 | 10/2005 | Ghyselen et al. |
| 6,996,324 B2 | 2/2006 | Hiraka et al. |
| 7,012,700 B2 | 3/2006 | De Groot et al. |
| 7,013,709 B2 | 3/2006 | Hajduk et al. |
| 7,015,894 B2 | 3/2006 | Morohoshi |
| 7,070,837 B2 | 7/2006 | Ross |
| 7,166,531 B1 * | 1/2007 | van den Hoek et al. ..... 438/623 |
| 7,184,064 B2 | 2/2007 | Zimmerman et al. |
| 7,461,564 B2 | 12/2008 | Glaesemann |
| 7,558,054 B1 | 7/2009 | Prest et al. |
| 7,626,807 B2 | 12/2009 | Hsu |
| 7,663,607 B2 | 2/2010 | Hotelling et al. |
| 7,810,355 B2 | 10/2010 | Feinstein et al. |
| 7,872,644 B2 | 1/2011 | Hong et al. |
| 7,918,019 B2 | 4/2011 | Chang et al. |
| 8,013,834 B2 | 9/2011 | Kim |
| 8,110,268 B2 | 2/2012 | Hegemier et al. |
| 8,111,248 B2 | 2/2012 | Lee et al. |
| 8,312,743 B2 | 11/2012 | Pun et al. |
| 8,393,175 B2 * | 3/2013 | Kohli et al. ................ 65/30.14 |
| 8,551,283 B2 | 10/2013 | Pakula et al. |
| 8,673,163 B2 | 3/2014 | Zhong |
| 8,684,613 B2 | 4/2014 | Weber et al. |
| 8,824,140 B2 | 9/2014 | Prest |
| 2002/0035853 A1 | 3/2002 | Brown et al. |
| 2002/0105793 A1 | 8/2002 | Oda |
| 2002/0155302 A1 | 10/2002 | Smith et al. |
| 2002/0157199 A1 | 10/2002 | Piltingsrud |
| 2003/0024274 A1 | 2/2003 | Cho et al. |
| 2003/0057183 A1 | 3/2003 | Cho et al. |
| 2003/0077453 A1 | 4/2003 | Oaku et al. |
| 2003/0234771 A1 | 12/2003 | Mulligan et al. |
| 2004/0051944 A1 | 3/2004 | Stark |
| 2004/0119701 A1 | 6/2004 | Mulligan et al. |
| 2004/0137828 A1 | 7/2004 | Takashashi et al. |
| 2004/0142118 A1 | 7/2004 | Takechi |
| 2004/0163414 A1 | 8/2004 | Eto et al. |
| 2005/0058423 A1 | 3/2005 | Brinkmann et al. |
| 2005/0105071 A1 | 5/2005 | Ishii |
| 2005/0135724 A1 | 6/2005 | Helvajian et al. |
| 2005/0174525 A1 | 8/2005 | Tsuboi |
| 2005/0193772 A1 | 9/2005 | Davidson et al. |
| 2005/0245165 A1 | 11/2005 | Harada et al. |
| 2005/0259438 A1 | 11/2005 | Mizutani |
| 2005/0285991 A1 | 12/2005 | Yamazaki |
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Wollmer et al. |
| 2006/0238695 A1 | 10/2006 | Miyamoto |
| 2006/0250559 A1 | 11/2006 | Bocko et al. |
| 2006/0268528 A1 | 11/2006 | Zadesky et al. |
| 2006/0292822 A1 | 12/2006 | Xie |
| 2006/0294420 A1 | 12/2006 | Schneider |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |
| 2007/0063876 A1 | 3/2007 | Wong |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |

(56) References Cited

U.S. PATENT DOCUMENTS

| | | |
|---|---|---|
| 2008/0094716 A1 | 4/2008 | Ushiro et al. |
| 2008/0135175 A1 | 6/2008 | Higuchi |
| 2008/0158181 A1 | 7/2008 | Hamblin et al. |
| 2008/0165139 A1 | 7/2008 | Hotelling et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0024484 A1 | 2/2010 | Kashima |
| 2010/0028607 A1 | 2/2010 | Lee et al. |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Mathew et al. |
| 2010/0321305 A1 | 12/2010 | Chang et al. |
| 2011/0003619 A1 | 1/2011 | Bolton |
| 2011/0012873 A1 | 1/2011 | Prest et al. |
| 2011/0019123 A1 | 1/2011 | Prest et al. |
| 2011/0019354 A1 | 1/2011 | Prest et al. |
| 2011/0030209 A1 | 2/2011 | Chang et al. |
| 2011/0056244 A1 | 3/2011 | Weng et al. |
| 2011/0063550 A1 | 3/2011 | Gettemy et al. |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0134050 A1 | 6/2011 | Harley |
| 2011/0140286 A1* | 6/2011 | Machida .............. H01L 23/13 257/777 |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0227399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1* | 8/2012 | Cornejo et al. ................. 428/43 |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |
| CN | 101523275 | 2/2009 |
| CN | 101465892 | 6/2009 |
| CN | 102131357 | 7/2011 |
| CN | 101267509 | 8/2011 |
| CN | 1322339 A | 11/2011 |
| CN | 202799425 U | 3/2013 |
| DE | 14 96 586 A1 | 6/1969 |
| DE | 17 71 268 A1 | 12/1971 |
| DE | 32 12 612 A1 | 10/1983 |
| DE | 103 22 350 A1 | 12/2004 |
| EP | 1038663 A2 | 9/2000 |
| EP | 1 206 422 B1 | 11/2002 |
| EP | 1 593 658 A1 | 11/2005 |
| EP | 1592073 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2233447 | 9/2010 |
| EP | 2483216 | 8/2012 |
| EP | 2635540 | 9/2013 |
| FR | 2 797 627 A1 | 2/2001 |
| FR | 2 801 302 A1 | 5/2001 |
| GB | 1 346 747 | 2/1974 |
| JP | B S42-011599 | 6/1963 |
| JP | B-S48-006925 | 3/1973 |
| JP | 55031944 | 3/1980 |
| JP | 55 067529 | 5/1980 |
| JP | 55-95645 | 7/1980 |
| JP | A S55-136979 | 10/1980 |
| JP | 55 144450 | 11/1980 |
| JP | A S59-013638 | 1/1984 |
| JP | 59037451 | 2/1984 |
| JP | A S61-097147 | 5/1986 |
| JP | 6066696 | 10/1986 |
| JP | 63 060129 | 3/1988 |
| JP | 63222234 | 9/1988 |
| JP | 5-32431 | 2/1993 |
| JP | 05249422 | 9/1993 |
| JP | 6242260 A | 9/1994 |
| JP | A H07-050144 | 2/1995 |
| JP | 52031757 | 3/1997 |
| JP | A-H09-073072 | 3/1997 |
| JP | A H09-507206 | 7/1997 |
| JP | 09-312245 | 12/1997 |
| JP | A H11-281501 | 10/1999 |
| JP | A 2000-086261 | 3/2000 |
| JP | 2000-163031 | 6/2000 |
| JP | 2000-163031 A | 6/2000 |
| JP | 200203895 A | 7/2000 |
| JP | A 2001-083887 | 3/2001 |
| JP | A 2002-160932 | 6/2002 |
| JP | 2002-342033 | 11/2002 |
| JP | 2002-342033 A | 11/2002 |
| JP | A 2002-338283 | 11/2002 |
| JP | A2003502257 | 1/2003 |
| JP | A2003-146705 | 5/2003 |
| JP | A 2004-094256 | 3/2004 |

(56) References Cited

FOREIGN PATENT DOCUMENTS

| JP | A2004-259402 | 9/2004 |
|---|---|---|
| JP | A2004-339019 | 12/2004 |
| JP | 2005-165249 | 6/2005 |
| JP | A 2005-156766 | 6/2005 |
| JP | A 2005140901 | 6/2005 |
| JP | 2007-099557 | 4/2007 |
| JP | 2008-001590 | 1/2008 |
| JP | 2008007360 | 1/2008 |
| JP | 2008-63166 A | 3/2008 |
| JP | 2008-066126 A | 3/2008 |
| JP | 2008-192194 | 8/2008 |
| JP | A 2008-195602 | 8/2008 |
| JP | A 2008-216938 | 9/2008 |
| JP | A 2008-306149 | 12/2008 |
| JP | A 2009-167086 | 7/2009 |
| JP | A 2009-234856 | 10/2009 |
| JP | A2009230341 | 10/2009 |
| JP | 2010 064943 | 3/2010 |
| JP | A 2010-060908 | 3/2010 |
| JP | A 2010-116276 | 5/2010 |
| JP | 2010/195600 | 9/2010 |
| JP | A 2010-237493 | 10/2010 |
| JP | 2011-032124 | 2/2011 |
| JP | A 2011-032140 | 2/2011 |
| JP | A 2011-158799 | 8/2011 |
| JP | 2011-527661 | 11/2011 |
| JP | A 2011-231009 | 11/2011 |
| JP | A 2013-537723 | 10/2013 |
| KR | 2010-2006-005920 | 1/2006 |
| KR | 10-2010-0019526 | 2/2010 |
| KR | 10-2011-0030919 | 3/2011 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004/014109 | 2/2004 |
| WO | WO 2004-061806 | 7/2004 |
| WO | WO 2004/106253 A | 12/2004 |
| WO | WO 2007/089054 A1 | 8/2007 |
| WO | WO 2008/044694 A | 4/2008 |
| WO | WO 2008/143999 A1 | 11/2008 |
| WO | WO 2009/003029 | 12/2008 |
| WO | WO 2009/078406 | 6/2009 |
| WO | WO 2009/099615 | 8/2009 |
| WO | WO 2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/008433 | 1/2011 |
| WO | WO 2011/041484 A1 | 4/2011 |
| WO | WO 2012/015960 | 2/2012 |
| WO | WO 2012/027220 A2 | 3/2012 |
| WO | WO 2012/106280 | 8/2012 |
| WO | WO 2013/106242 A2 | 7/2013 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chemically Strengthened Glass, Wikipedia, Apr. 19, 2009, http://en/wikipedia.org/w/index.
php?title=Chemically_strengthened_glass&oldid=284794988.

Wikipedia: "Iphone 4", www.wikipedia.org, retrieved Oct. 31, 2011, 15 pgs.

"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.

Arun K. Varshneya, Chemical Strengthening of Glass: Lessons Learned and Yet to be Learned, International Journal of Applied Glass Science, 2010, 1, 2, pp. 131-142.

International Search Report and Written Opinion for International Patent Application No. PCT/US2012/055613, dated Dec. 20, 2012.

Aben "Laboratory of Photoelasticity", Institute of Cybernetics at TTU, www.ioc.ee/res/photo.html, Oct. 5, 2000.

Forooghian et al., Investigative Ophthalmology & Visual Science; Oct. 2008, vol. 49, No. 10.

"iPhone 4", Wikipedia, Jan. 4, 2012, 17 pgs.

Mehrl et al., "Designer's Noticebook: Proximity Detection IR LED and Optical Crosstalk", http://ams.com/eng/content/view/download/145137, Aug. 1, 2011, 5 pages.

Ohkuma, "Development of a Manufacturing Process of a Thin, Lightweight LCD Cell", Department of Cell Process Development, IBM, Japan, Section 13.4.

Lee et al., "A Multi-Touch Three Dimensional Touch-Sensitive Tablet", Proceedings of CHI: ACM Conference on Human Factors in Computing Systems, Apr. 1985, pp. 21-25.

Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.

Rubine, "Combining Gestures and Direct Manipulation", CHI'92, May 1992, pp. 659-660.

Westerman, "Hand Tracking, Finger Identification and Chrodic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.

Karlsson et al., "The Technology of Chemical Glass Strengthening—a review", Apr. 2010, Glass Technology, European Journal of Glass Science and Technology A., vol. 51, No. 2, pp. 41-54.

Notice of Preliminary Rejection for Korean Patent Application No. 10-2014-7006648, dated May 19, 2015.

Office Action for Japanese Patent Application 2014-530901, dated Jun. 5, 2015.

First Office Action for Chinese Patent Application No. 201280044473.0, dated Jul. 2, 2015.

Kingery et al., "Introduction to Ceramics" 2nd Ed. John Wiley & Sons, 1976, pp. 792 and 833-844.

Office Action for Chinese Patent Application No. 201280044473.03 dated Feb. 16, 2016.

Office Action for Japanese Patent Application No. 2014-530901, dated Feb. 29, 2016.

Office Action for EP Patent Application No. 12770355.1, dated Jan. 15, 2016.

* cited by examiner

PERFORATED MOTHER SHEET FOR PARTIAL EDGE CHEMICAL STRENGTHENING AND METHOD THEREFOR

FIELD OF THE DISCLOSURE

This relates generally to the chemical strengthening of substrates, and more particularly, to the formation of voids in substrates to allow chemical strengthening of substrate edges.

BACKGROUND OF THE DISCLOSURE

Touch sensor panels can be fabricated as one or more thin films deposited and patterned into conductive traces upon one or both sides of a chemically strengthened sheet of glass. However, standard thin film processing equipment does not allow for thin film deposition on custom-sized or shaped sheets of glass. Instead, thin film deposition occurs on large, rectangular sheets of glass (called mother sheets) which are subsequently separated and shaped into a plurality of individual glass sheets. The individual sheets are typically used in separate electronic devices.

When the mother sheet is separated into individual sheets, however, a new set of edges is formed along each path of separation. Because the new set of edges has not been chemically treated, the individual sheets are susceptible to cracking.

Techniques for chemically strengthening glass require immersion of the sheet into a chemical treatment for a certain period of time and at a certain temperature. In many cases, chemically strengthening the edges is infeasible since the exposed film would be damaged by the chemicals and/or the temperature required for the treatment.

SUMMARY OF THE DISCLOSURE

This relates to chemically strengthening the edges of glass sheets adapted to have thin films deposited on at least one surface. Thin films can be deposited and patterned upon discrete regions of a chemically strengthened sheet of glass. This sheet of glass is called a mother sheet. The mother sheet can be cut (i.e., singulated) into separate sheets, where each singulated sheet can be adapted to service a separate electronic component or device.

When the mother sheet is separated into individual sheets, a new set of edges are formed at the path of separation. Additional new edges can be formed after separation during free shaping of curved edges on the individual sheets. These new edges on the individual sheets have not been chemically strengthened and therefore can be sensitive to forces exerted upon them. While applying a chemical strengthener to the edges of the sheets may protect the sheets from cracking, this process can damage exposed regions of the thin film. Moreover, because standard thin film equipment lacks the capability to apply thin film processes to glass in different and/or smaller sizes than a mother sheet, in many cases, the thin film deposition process must precede the separation process.

Various embodiments address these concerns by forming a portion of the new edges of the individual sheets prior to the initial chemical strengthening of the mother sheet. This can be done without separating the mother sheet into individual sheets. As a result, processing with standard thin film equipment can still be possible. In one embodiment, voids can be formed in a mother sheet. The edges of these voids may correspond to a portion of the new edges that would normally be created during separation and free shaping. The mother sheet can then be immersed in a chemical strengthener. The edges of the voids can be chemically strengthened in addition to the front and back sides of the mother sheet. After thin film processing and separation, each of the resulting individual sheets has been chemically strengthened on both sides and on a portion of its edges.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

Various embodiments relate to chemically strengthening the edges of glass sheets adapted to have thin films deposited on at least one surface. Thin films can be deposited and patterned upon discrete regions of a chemically strengthened sheet of glass. This sheet of glass is called a mother sheet. The mother sheet can be cut (i.e., singulated) into separate sheets, where each singulated sheet can be adapted to service a separate electronic component or device.

When the mother sheet is separated into individual sheets, a new set of edges are formed at the path of separation.

Additional new edges can be formed after separation during free shaping of curved edges on the individual sheets. These new edges on the individual sheets have not been chemically strengthened and therefore can be sensitive to forces exerted upon them. While applying a chemical strengthener to the edges of the sheets may protect the sheets from cracking, this process can damage exposed regions of the thin film. Moreover, because standard thin film equipment lacks the capability to apply thin film processes to glass in different and/or smaller sizes than a mother sheet, in many cases, the thin film deposition process must precede the separation process.

Various embodiments address these concerns by forming a portion of the new edges of the individual sheets prior to the initial chemical strengthening of the mother sheet. This can be done without separating the mother sheet into individual sheets. As a result, processing with standard thin film equipment can still be possible. In one embodiment, voids can be formed in a mother sheet. The edges of these voids may correspond to a portion of the new edges that would normally be created during separation and free shaping. The mother sheet can then be immersed in a chemical strengthener. The edges of the voids can be chemically strengthened in addition to the front and back sides of the mother sheet. After thin film processing and separation, each of the resulting individual sheets has been chemically strengthened on both sides and on a portion of its edges.

Although embodiments may be described and illustrated herein in terms of touch sensor panels, it should be understood that embodiments are not so limited, but can be additionally applicable to any circuit or communication path formed on a glass substrate or other substrate prone to weakness at an unstrengthened edge.

FIGS. 1A-1D illustrate an exemplary method of strengthening glass according to embodiments of the disclosure. Each figure in the sequence depicts a portion of the described method.

Figure 1A:
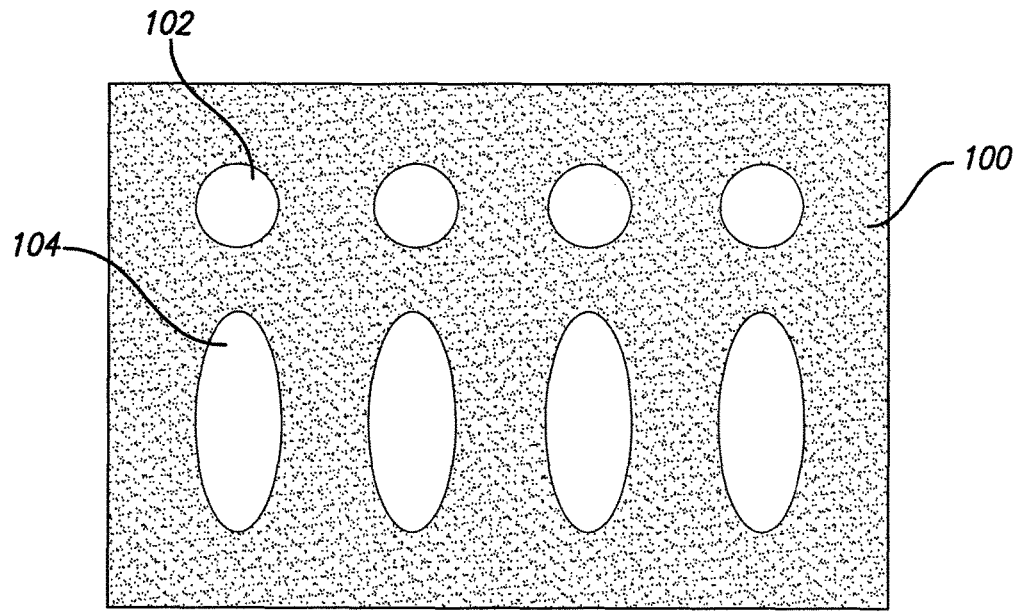
FIG. 1A illustrates an exemplary void-forming process according to embodiments of the disclosure.

FIG. 1A illustrates an exemplary void-forming process according to embodiments of the disclosure. Initially, a mother sheet 100 can be adapted to have portions removed to form one or more voids. The mother sheet is often a large, rectangular sheet of glass, but may be any size or shape according to various embodiments.

One or more voids 102 and 104 can then be formed in discrete regions of the mother sheet 100. Note that even though FIG. 1A depicts eight voids formed in the mother sheet 100, any number of voids can be formed according to various embodiments. Additionally, the voids can be situated in any position along the mother sheet 100.

Any number of means or mechanisms can be used in order to form the voids 102 and 104 in mother sheet 100. This includes, without limitation, etching, laser scribing, mechanical scribing, and/or grinding and polishing. In some embodiments, the voids can be formed as circles or ovals (e.g., as depicted by the edges of voids 102 and 104). However, the voids may be formed using any pattern or geometry according to embodiments. This includes rectangles, trapezoids, and shapes including both curved and straight edges.

Figure 1B:
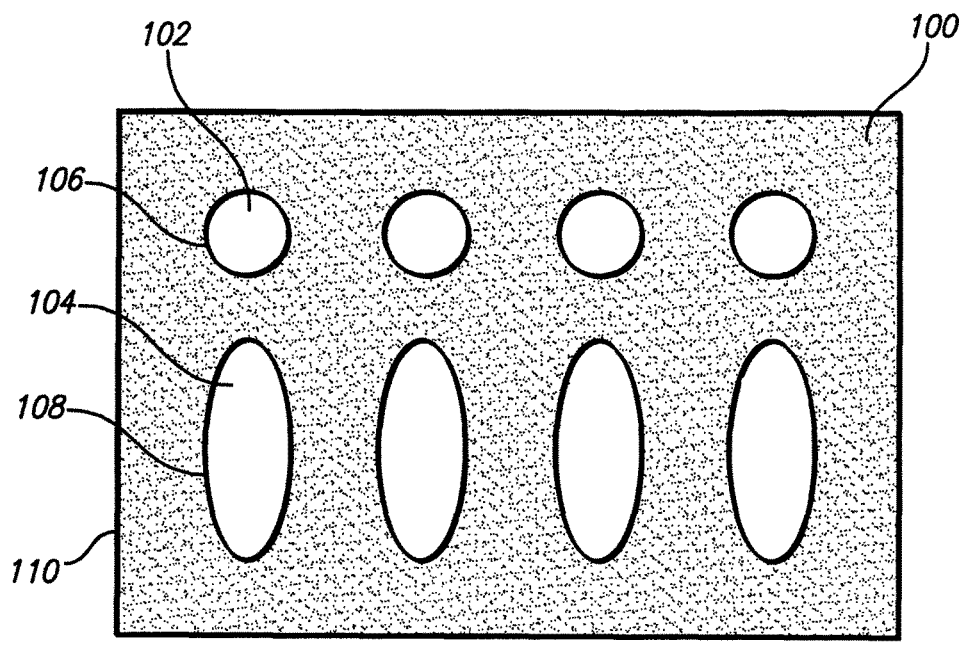
FIG. 1B illustrates an exemplary mother sheet after a strengthening process has occurred according to embodiments of the disclosure.

FIG. 1B illustrates an exemplary mother sheet 100 after a strengthening process has occurred according to embodiments of the disclosure. In several embodiments, the entire mother sheet 100 can be strengthened by applying a global treatment to the mother sheet. At least a portion of mother sheet 100 can be immersed in one or more chemical substances and treated at a certain temperature. For example, in one embodiment, the chemical substance can comprise potassium nitrate ($KNO_3$) applied to the sheets at approximately 350° C. Once the treatment process has been completed, the outer edge 110 and the edges 106 and 108 of the voids 102 and 104, respectively, have been strengthened.

In other embodiments, the strengthening process can include applying a localized treatment to unstrengthened edges of the voids 102 and 104. In certain embodiments where the mother glass 100 has already been chemically strengthened (for example, by prior immersion in chemical strengthener), application of the localized treatment to the unstrengthened edges of the voids 102 and 104 can result in a mother glass 100 with strengthened surfaces on all sides and edges. The substances used to strengthen the unstrengthened edges of the voids 102 and 104 may be the same or may be different than the substances used to strengthen the mother sheet 100 according to some embodiments.

Additionally, the localized treatment may include, without limitation, one or more of the following: edge polishes (e.g., via cerium oxide or other similar compounds), acid polishes, chemical etches (e.g., via hydrogen fluoride or hydrogen chloride), localized heat treatment (e.g., bringing the glass to its glass transition temperature in the range of 500° C.-620° C.) and/or chemical treatments. In many embodiments, the chemical treatment can include filling flaws in the surface of the mother sheet 100 with an adhesive or other similar substance. In one embodiment, for example, potassium nitrate ($KNO_3$) can be applied to the unstrengthened regions at 350° C.

Figure 1C:
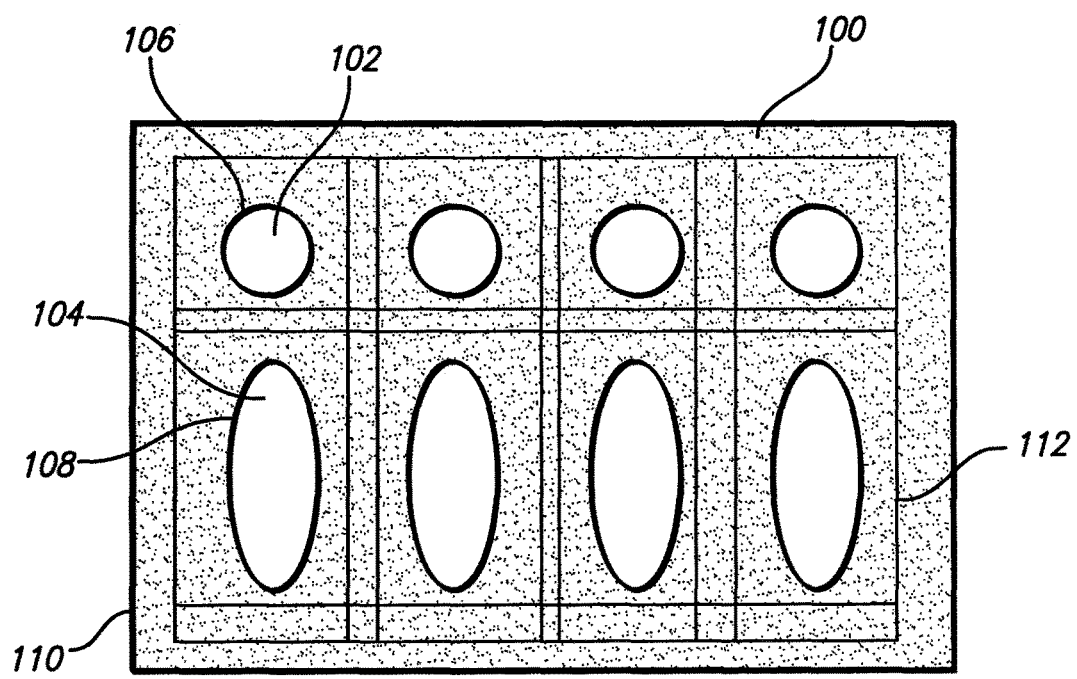
FIG. 1C illustrates an exemplary mother sheet after thin film deposition according to embodiments of the disclosure.

FIG. 1C illustrates an exemplary mother sheet 100 after thin film deposition according to embodiments of the disclosure. One or more thin films 112 can be deposited upon regions of the mother sheet 100 and patterned. Note that any number of thin films 112 may be deposited on the mother sheet 100 according to various embodiments. Additionally, the thin films 112 can be situated in any position along both axes of the surface of the mother sheet 100.

In some embodiments, at least one of the thin films 112 is indium tin oxide (ITO). In some embodiments, other materials can be utilized in addition to, or instead of, ITO. These materials include, without limitation, amorphous silicon, copper indium diselenide, cadmium telluride, and film crystalline silicon. Optionally, the thin films 112 can be protected by one or more passivation layers (organic and/or inorganic). Passivation layers are compositions formed over conductive material and other layers which protect those materials from corrosion and other environmental effects. Various types of passivation can be employed according to embodiments. These include, without limitation, passivation layers comprising silicon dioxide ($SiO_2$) and/or silicon nitride (SiNx).

Figure 1D:
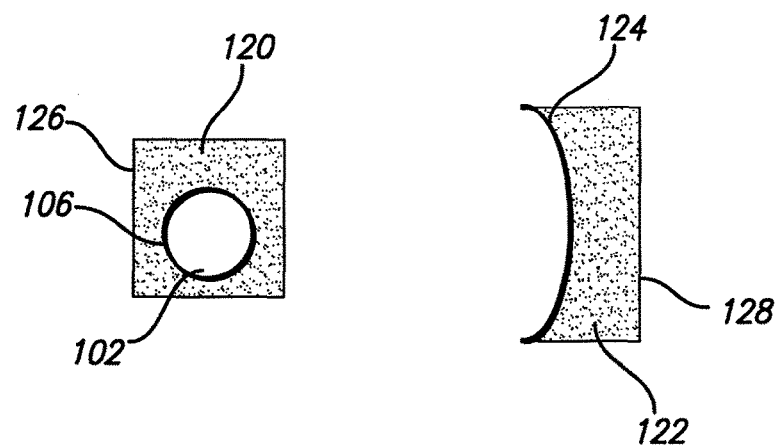
FIG. 1D illustrates a separation process according to embodiments of the disclosure.

FIG. 1D illustrates a separation process according to embodiments of the disclosure. As shown in the figure, the mother sheet 100 has been separated into individual sheets 120 and 122. Note that even though FIG. 1D depicts two sheets being formed from the mother sheet 100, any number of individual sheets may be formed from the mother sheet. Also note that in some embodiments, the individual sheets can be further shaped (e.g., cut into a specific geometry) upon separation from the mother sheet 100.

Additionally, any number of means or mechanisms can be used in order to accomplish separation from the mother sheet 100. This includes, without limitation, etching, laser scribing, mechanical scribing, and/or grinding and polishing.

Once the individual sheets have been separated, the strengthened edges 106 and 108 of the voids can form a portion of the edges of the individual sheets 120 and 122. In some embodiments, a void can be intact after separation and form an inner edge of an individual sheet. For example, after separation, void 102 remains intact after separation and forms inner edge 106 in the individual sheet 120. Additionally, where a void falls along the path of separation, a portion of the edge of the void can form an edge of an individual sheet. For example, void 104 falls along a path of separation, and a portion of strengthened edge 108 forms the edge 124 of individual sheet 122.

Additionally, one or more unstrengthened edges 126 and 128 can be formed along the paths of separation. In several embodiments, such as the one illustrated in FIG. 1D, the unstrengthened edges can adjoin one or more surfaces that have already been chemically strengthened (for example, by a strengthening process applied to the mother sheet 100 and the strengthened edges 106 and 124.) In some embodiments, the unstrengthened edges 106 and 124 can be part of a larger set of unstrengthened regions.

Figure 2:
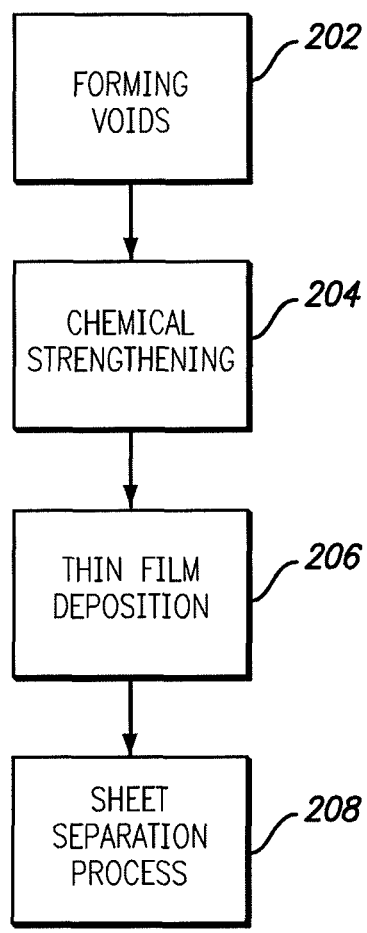
FIG. 2 is a high-level flow diagram illustrating an exemplary method of strengthening a substrate according to embodiments of the disclosure.

FIG. 2 is a high-level flow diagram illustrating an exemplary method of strengthening a substrate according to embodiments of the disclosure. At block 202, one or more voids can be formed in a mother sheet. Many methods may be used to form voids according to various embodiments. This includes, without limitation, etching, laser scribing, mechanical scribing, and/or grinding and polishing.

At block 204, the mother sheet can then be chemically strengthened. In some embodiments, this chemical strengthening process can include immersing the sandwich into a chemical substance at specific temperature settings (e.g., potassium nitrate ($KNO_3$) at 350° C.). In other embodiments, the chemical strengthening process can include subjecting the mother sheet to an edge polishing procedure, a chemical etch or acid polish procedure, or a localized heat or chemical treatment.

At block 206, one or more thin films can be deposited on the mother sheet. In various embodiments, at least one of the thin films is ITO. In some embodiments, other materials are utilized, including amorphous silicon, copper indium diselenide, cadmium telluride, and film crystalline silicon.

At block 208, the mother sheet can be separated and/or shaped into multiple smaller sheets. In some embodiments, methods used to accomplish separation and shaping may include etching, laser scribing, mechanical scribing, and/or grinding and polishing.

According to embodiments such as those illustrated in FIG. 1, voids may be formed with curved edges. Techniques such as laser scribing may not be available to form curved edges, and other techniques, such as etching, may be more susceptible to forming micro-cracks in the edges, which can weaken the durability of the glass and make curved edges more likely to break. As a result, in some embodiments it may be important to ensure that the curved edges are chemically strengthened.

Figure 3:
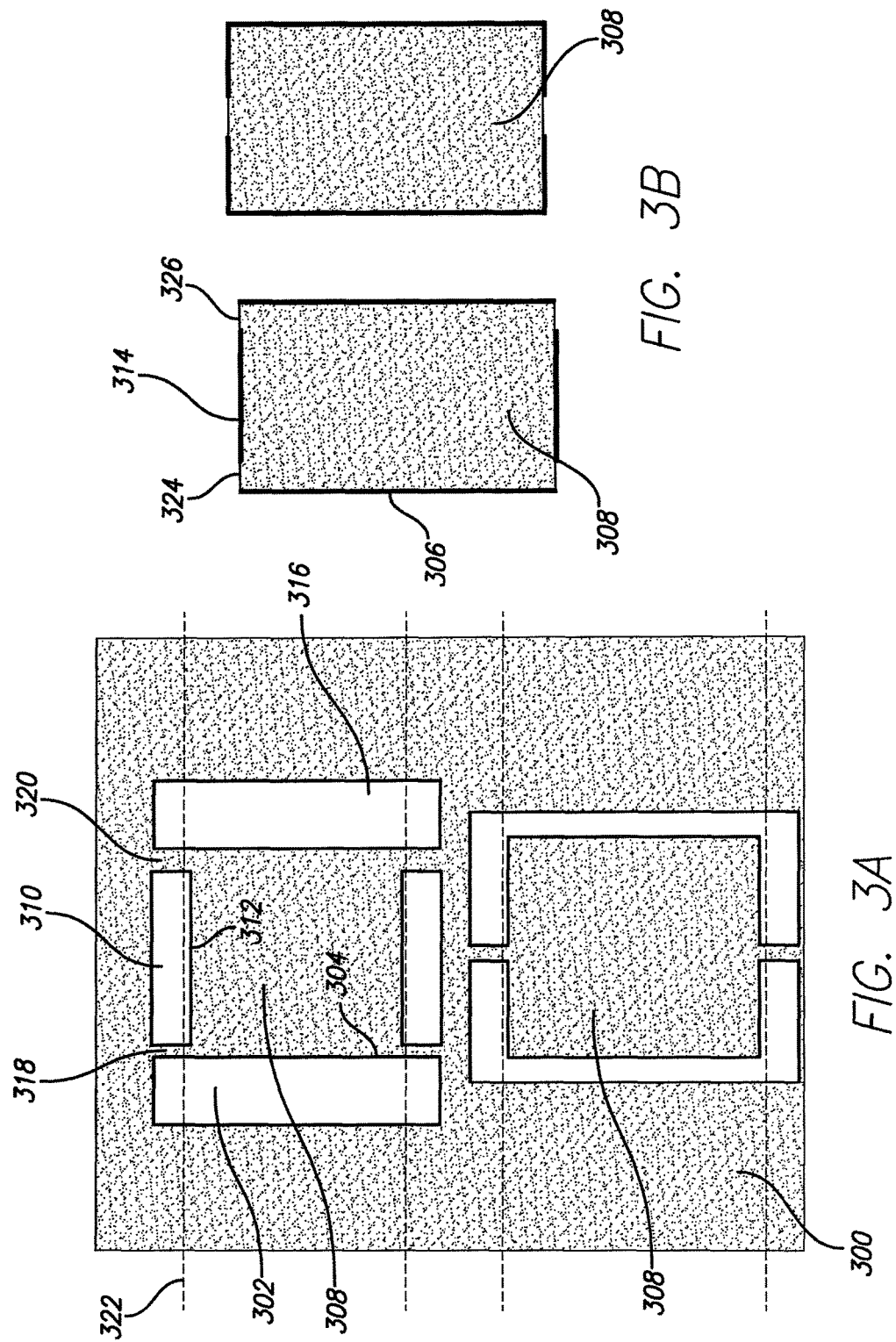
FIG. 3A illustrates an exemplary mother sheet after edges of the voids have been strengthened according to embodiments of the disclosure.
FIG. 3B illustrates an exemplary mother sheet after separation according to embodiments of the disclosure.

In other embodiments, it may be important to maximize the strengthened perimeter of an individual sheet, rather than focusing on curved edges. FIGS. 3A and 3B illustrate another exemplary method of strengthening glass according to embodiments of the disclosure.

FIG. 3A illustrates an exemplary mother sheet after voids have been formed and the edges of the voids have been strengthened according to embodiments of the disclosure. FIG. 3B illustrates an exemplary mother sheet after separation according to embodiments of the disclosure.

In some embodiments, the voids can be arranged so that after separation, a high proportion of the perimeter of each individual sheet has been chemically strengthened. For example, void 302 can be arranged so that edge 304 corresponds to the entire length of edge 306 on individual sheet 308 after separation. Because the entire length of edge 306 can be formed from void edge 304, the entire length of edge 306 can be chemically strengthened. Additionally, void 310 can be arranged so that edge 312 corresponds with a substantial portion of edge 314 on individual sheet 308 after separation. The individual sheets 308 before separation, identified as areas 308 in FIG. 3A, may be referred to herein as pre-singulated sheets 308.

The formation of voids 302, 316, and 310 can also form tabs 318 and 320 which keep the panel from being separated from mothersheet 300. The tabs 318 and 320 can be positioned along the path of separation 322. Unstrengthened edge portions 324 and 326 can be formed where individual panel 308 was separated from tabs 318 and 320. Decreasing the width of tabs 318 and 320 can decrease the length of unstrengthened edge portions 324 and 326. Accordingly, the strengthened perimeter of individual sheet 308 can be maximized by minimizing the width of tabs 318 and 320.

However, narrowing the tabs can have negative consequences. For example, the tabs may be used to run conductive traces to thin films patterned on the mother sheet. These traces may be used in testing prior to separation, and so the tabs must be wide enough to accommodate the conductive traces. Additionally, the laser scribing process may require that its target have a minimum width for the scribing to be effective. Accordingly, if laser scribing is used to separate the individual sheets from the mother sheet, the tabs must be at least that minimum width for the separation to be successful. Finally, thin film processing can require rigidity and durability in the mother sheet, and tabs that are too narrow might compromise the rigidity and durability of the mother sheet during thin film processing.

Figure 4:
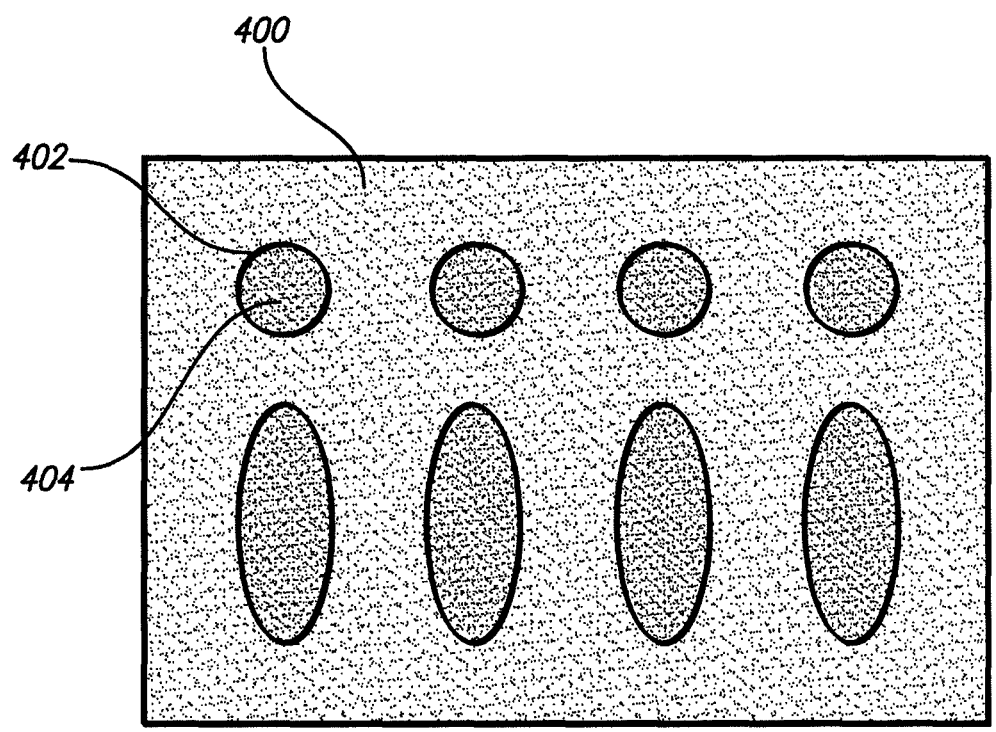
FIG. 4 illustrates an exemplary mother sheet with voids that have been filled with plug material according to embodiments of the disclosure.

According to some embodiments, plug material may be used to fill voids, which can enhance the rigidity and durability of the mother sheet during thin film processing. FIG. 4 illustrates an exemplary mother sheet with voids that have been filled with plug material according to embodiments of the disclosure. Void 402 can be formed in mother sheet 400 and filled with plug material 404. Mother sheet 400 can then be subjected to thin film processing, and plug material 404 can subsequently be removed.

In some embodiments, the plug material can be applied to the voids through a coating process or a flat process such as a squeegee. In some embodiments, solvent stripping can be used after application to smooth out the material. The material can then be heated to evaporate the solvent from inside the material.

Any number of materials can be used to fill in the voids. For example, the plug material can be made of organic material, silicon dioxide, or metals. In some embodiments, the material can be resistant to the acidity of the chemicals used in thin film processing, and the material can withstand the high temperature at which thin film processing occurs. In some embodiments, the material can be easily removable when the processing is complete. For example, a material such as silicon dioxide ($SiO_2$) is resilient to acidity and heat and can be easily removed with a solvent.

Figure 5:
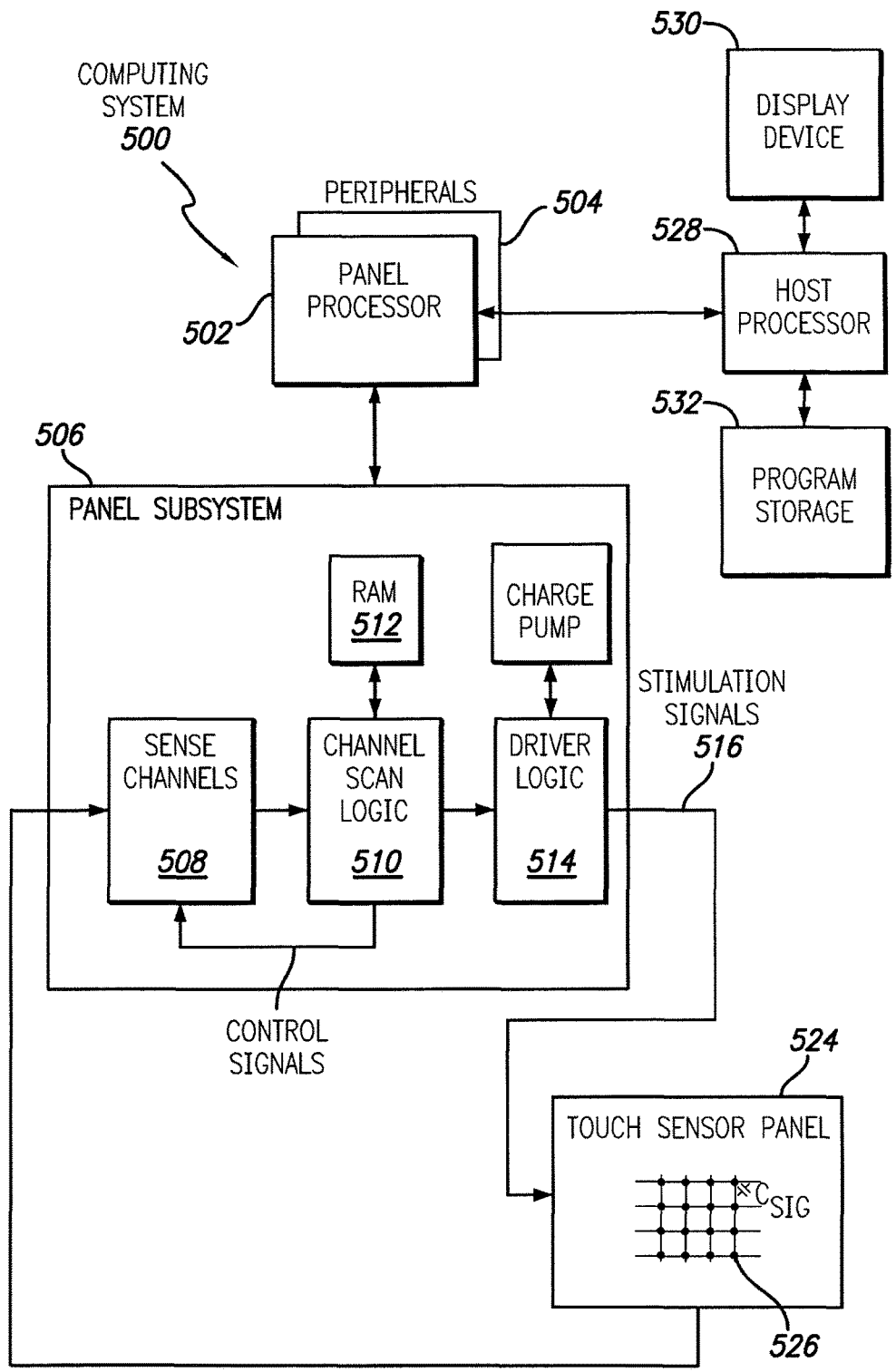
FIG. 5 illustrates an exemplary computing system including a touch sensor panel situated on a glass substrate that has been strengthened according to embodiments of the disclosure.

FIG. 5 illustrates exemplary computing system 500 that can include a touch sensor panel 524 situated on a glass substrate that has been strengthened by one or more of the embodiments described above. Computing system 500 can include one or more panel processors 502 and peripherals 504, and panel subsystem 506. Peripherals 504 can include, but are not limited to, random access memory (RAM)or other types of memory or storage, watchdog timers and the like. Panel subsystem 506 can include, but is not limited to, one or more sense channels 508, channel scan logic 510 and driver logic 514. Channel scan logic 510 can access RAM 512, autonomously read data from the sense channels and provide control for the sense channels. In addition, channel scan logic 510 can control driver logic 514 to generate stimulation signals 516 at various frequencies and phases that can be selectively applied to drive lines of touch sensor panel 524. In some embodiments, panel subsystem 506, panel processor 502 and peripherals 504 can be integrated into a single application specific integrated circuit (ASIC).

Touch sensor panel 524 can include a capacitive sensing medium having a plurality of drive lines and a plurality of sense lines, although other sensing media can also be used. Each intersection of drive and sense lines can represent a capacitive sensing node and can be viewed as picture element (pixel) 526, which can be particularly useful when touch sensor panel 524 is viewed as capturing an "image" of touch. (In other words, after panel subsystem 506 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 524 can drive sense channel 508 (also referred to herein as an event detection and demodulation circuit) in panel subsystem 506.

Computing system 500 can also include host processor 528 for receiving outputs from panel processor 502 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/ or the like. Host processor 528 can also perform additional functions that may not be related to panel processing, and can be coupled to program storage 532 and display device 530 such as an LCD display for providing a UI to a user of the device. Display device 530 together with touch sensor panel 524, when located partially or entirely under the touch sensor panel, can form touch screen 518.

Figure 6A:
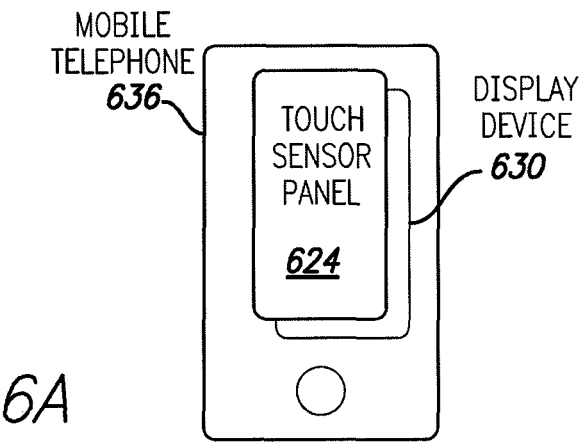
FIG. 6A illustrates an exemplary mobile telephone having a touch sensor panel situated on a glass substrate that has been strengthened according to embodiments of the disclosure.

FIG. 6A illustrates exemplary mobile telephone 636 that can include touch sensor panel 624 and display device 630, the touch sensor panel formed upon a glass substrate that has been strengthened according to various embodiments.

Figure 6B:
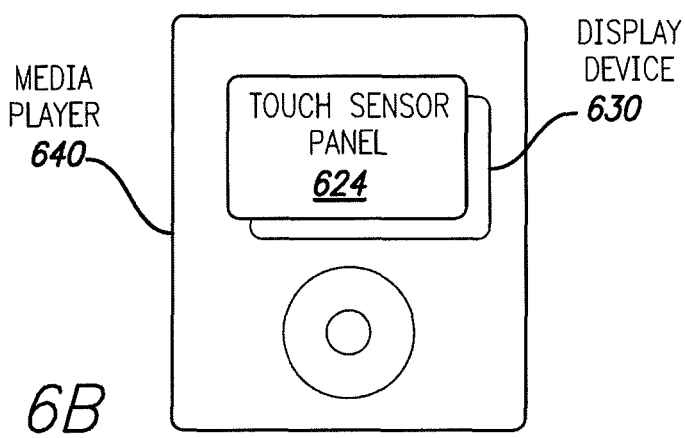
FIG. 6B illustrates an exemplary digital media player having a touch sensor panel situated on a glass substrate that has been strengthened according to embodiments of the disclosure.

FIG. 6B illustrates exemplary digital media player 640 that can include touch sensor panel 624 and display device 630, the touch sensor panel formed upon a glass substrate that has been strengthened according to various embodiments.

Figure 6C:
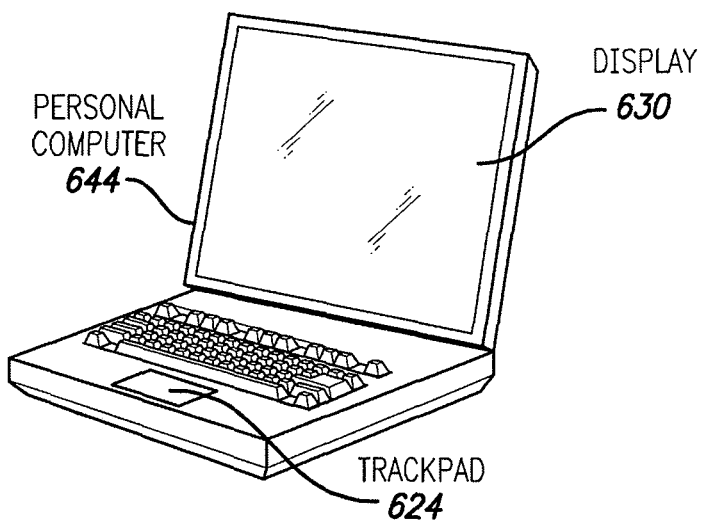
FIG. 6C illustrates an exemplary personal computer having a touch sensor panel (trackpad) and/or display situated on a glass substrate that has been strengthened according to embodiments of the disclosure.

FIG. 6C illustrates exemplary personal computer 644 that can include touch sensor panel (trackpad) 624 and display 630, the touch sensor panel and/or display of the personal computer (in embodiments where the display is part of a touch screen) including a glass substrate that has been strengthened according to embodiments. The mobile telephone, media player and personal computer of FIGS. 6A, 6B and 6C can achieve improved overall durability by utilizing the strengthened glass substrate according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method comprising:
    forming one or more voids passing through a mother sheet of glass from a first surface of the mother sheet to a second surface of the mother sheet opposite the first surface;
    processing the mother sheet to strengthen one or more edges of the one or more voids in the mother sheet, the processing of the mother sheet to strengthen the one or more edges includes at least chemically strengthening of the one or more edges using ion exchange; and
    separating the mother sheet to form a plurality of individual sheets,
    wherein at least one of the one or more voids are formed along an entire length of at least one edge of one or more of the plurality of individual sheets, and
    wherein at least a portion of each of the individual sheets is a component for a touch sensor.

2. The method of claim 1, further comprising: processing the mother sheet after strengthening the one or more edges of the one or more voids in the mother sheet to form conductive traces on the mother sheet.

3. The method of claim 1, further comprising filling the one or more voids with a plug material.

4. The method of claim 1, wherein forming the one or more voids in the mother sheet includes shaping and locating the one or more voids to form the one or more edges.

5. The method of claim 1, wherein forming the one or more voids in the mother sheet includes shaping and locating the one or more voids to create one or more tabs connecting the mother sheet to a plurality of pre-singulated sheets, the tabs configured for minimizing unstrengthened edges of the plurality of pre-singulated sheets after separation from the mother sheet, and
    wherein separating the mother sheet to form the plurality of individual sheets includes separating the plurality of pre-singulated sheets from the mother sheet at the one or more tabs to form the plurality of individual sheets.

6. The method of claim 5, further comprising configuring a width of the tabs to minimally accommodate a plurality of conductive traces for testing the pre-singulated sheets prior to separation from the mother sheet.

7. The method of claim 2, further comprising filling the one or more voids with a plug material prior to forming the conductive traces on the mother sheet.

8. The method of claim 1, wherein strengthening the one or more edges of the one or more voids in the mother sheet comprises applying a global strengthening treatment to the mother sheet.

9. The method of claim 1, wherein the processing the mother sheet to strengthen the one or more edges of the one or more voids in the mother sheet comprises applying a localized strengthening treatment to the mother sheet.

10. The method of claim 9, wherein the localized strengthening treatment includes applying an edge polish to the one or more edges of the one or more voids.

11. The method of claim 9, wherein the localized strengthening treatment includes applying a chemical etch to the one or more edges of the one or more voids.

12. The method of claim 9, wherein the localized strengthening treatment includes applying an acid polish to the one or more edges of the one or more voids.

13. The method of claim 8, wherein the global strengthening treatment includes immersing the mother sheet into a chemical strengthener.

14. The method of claim 1, wherein separating the mother sheet to form the plurality of individual sheets includes separating along a path of separation that intersects at least one of the one or more voids.

15. A method comprising:
forming one or more voids in a mother sheet of glass;
processing the mother sheet using ion exchange to strengthen one or more edges of the one or more voids in the mother sheet;
filling the one or more voids with a plug material;
processing the mother sheet to form conductive traces on the mother sheet;
removing the plug material from the one or more voids; and
subsequent to removing the plug material, separating the mother sheet to form a plurality of individual sheets, wherein at least one entire edge length of at least one of the plurality of individual sheets forms an edge of at least one of the one or more voids;
wherein at least a portion of a perimeter of each of the plurality of individual sheets is chemically strengthened.

16. The method of claim 15, wherein forming the one or more voids in the mother sheet includes shaping and locating the one or more voids to form the one or more edges.

17. The method of claim 15, wherein strengthening the one or more edges of the one or more voids in the mother sheet further comprises applying a localized strengthening treatment to the mother sheet.

18. The method of claim 17, wherein the localized strengthening treatment includes applying an edge polish to the one or more edges of the one or more voids.

19. The method of claim 17, wherein the localized strengthening treatment includes applying a chemical etch to the one or more edges of the one or more voids.

20. The method of claim 15, wherein separating the mother sheet to form the plurality of individual sheets includes separating along a path of separation that intersects at least one of the one or more voids.

21. A method comprising:
forming one or more voids passing through a mother sheet of glass;
processing the mother sheet to strengthen one or more edges of the one or more voids in the mother sheet, the processing of the mother sheet to strengthen the one or more edges includes at least chemically strengthening of the one or more edges using ion exchange; and
separating the mother sheet to form a plurality of individual sheets, after processing the mother sheet,
wherein at least one side of the one or more voids are formed along an entire length of at least one side of at least one of the plurality of individual sheets,
wherein at least a substantial portion of a perimeter of at least one of the plurality of individual sheets is strengthened.

22. The method of claim 21, wherein the method comprises: after chemical strengthening the one or more edges and before the separating, processing the mother sheet to form conductive traces on the mother sheet.

* * * * *